No. 129,204

UNITED STATES PATENT OFFICE.

WILLIAM ARCHDEACON, OF CHICAGO, ILLINOIS.

IMPROVEMENT IN PREPARING WOODEN VESSELS FOR HOLDING ACIDS.

Specification forming part of Letters Patent No. 129,204, dated July 16, 1872.

SPECIFICATION.

I, WILLIAM ARCHDEACON, of the city of Chicago, in the county of Cook and State of Illinois, have invented certain new and useful improvements in preparing wooden vessels to retain acids and resist the action thereof, of which the following is a full description:

The object of my invention is principally to prepare small kits or kegs of from one to four gallons in capacity, so as to form a suitable package for the preservation and transportation of pickles and similar articles usually preserved in vinegar; but vessels prepared by my process may be used for holding dilute acids of any kind, and even acids of considerable strength. Its nature consists in filling the pores of the wood, and coating the interior of vessels after they are completed by pressure, and in the use of an improved composition for such use.

To close and coat vessels by my process and composition, I first make a composition by taking seventy-five parts of bees-wax and twenty-five parts of glue; I then put them in sufficient water to dissolve the glue. The glue absorbs the water while the heat melts the wax as I incorporate them together, and use the compound while hot. The proportions named need not be exact, as a variation of the proportions will not materially injure the composition. The proportions given are, however, those deemed best in practice. By using twelve and one-half parts of glue and twelve and one-half parts of alum a more finished appearance will be given to the work, and will not change the mode of working the composition, or of its application.

For mixing the parts I use a kettle with a steam-jacket, or a small boiler with a direct application. I next take about one pint of the mixture or compound for a gallon kit or keg and pour it in while hot; I then take a steam-pipe, provided with an end suitable to close the hole in the kit, and put on from fifteen to twenty pounds of steam-pressure (that is as much as the strength of the vessel will permit) and agitate the mixture while the pressure is on by moving the vessel around the steam-pipe. This pressure forces the mixture into the pores of the wood and completely fills them, and it also finely coats the inside, as a small portion adheres after turning out the surplus. If, however, the inner coating should become broken or partially removed, it will not injure the vessel, as there is a sufficient amount remaining in the pores to protect the wood.

This compound may also be forced, to some extent, into the pores of the wood by placing a quantity heated hot in the vessel, and immediately stopping the aperture through which it was introduced, so that the steam and heated air inclosed will by their expansion produce a pressure. I prefer the first method, as it is more complete in its results.

Vessels prepared in this way will resist the action of vinegar and preserve pickles for the usual length of time without injury to the wood or to the pickles, and without imparting any flavor to them when made of pine or other resinous woods, or of oak.

What I claim as new is as follows:

1. The composition of glue and wax, substantially in the proportions and for the purpose set forth.

2. The process of rendering wooden vessels suitable for containing and preserving articles in acids by applying the composition under sufficient pressure to thoroughly impregnate the wood, substantially as specified.

WILLIAM ARCHDEACON.

Witnesses:
E. A. WEST,
O. W. BOND.